Sept. 9, 1969 D. J. PARKER 3,465,865

STENOGRAPHIC TYPEWRITER WITH MNEMONIC MEANS

Filed Oct. 5, 1967

DAVID J. PARKER
INVENTOR

BY Morton C. Jacobs

ATTORNEY

United States Patent Office 3,465,865

Patented Sept. 9, 1969

3,465,865

STENOGRAPHIC TYPEWRITER WITH MNEMONIC MEANS

David J. Parker, P.O. Box 177, Brentwood, Md. 20722

Filed Oct. 5, 1967, Ser. No. 673,045
Int. Cl. B41j 3/26, 3/10
U.S. Cl. 197—9 4 Claims

ABSTRACT OF THE DISCLOSURE

A keyboard for a stenographic typewriter is provided with one or more non-phonetic keys for use as mnemonic symbols, which are selectively and simultaneously operable with all of the phonetic keys in any desired combination by the operator's fingers in normal stenographic usage.

Figure 1:
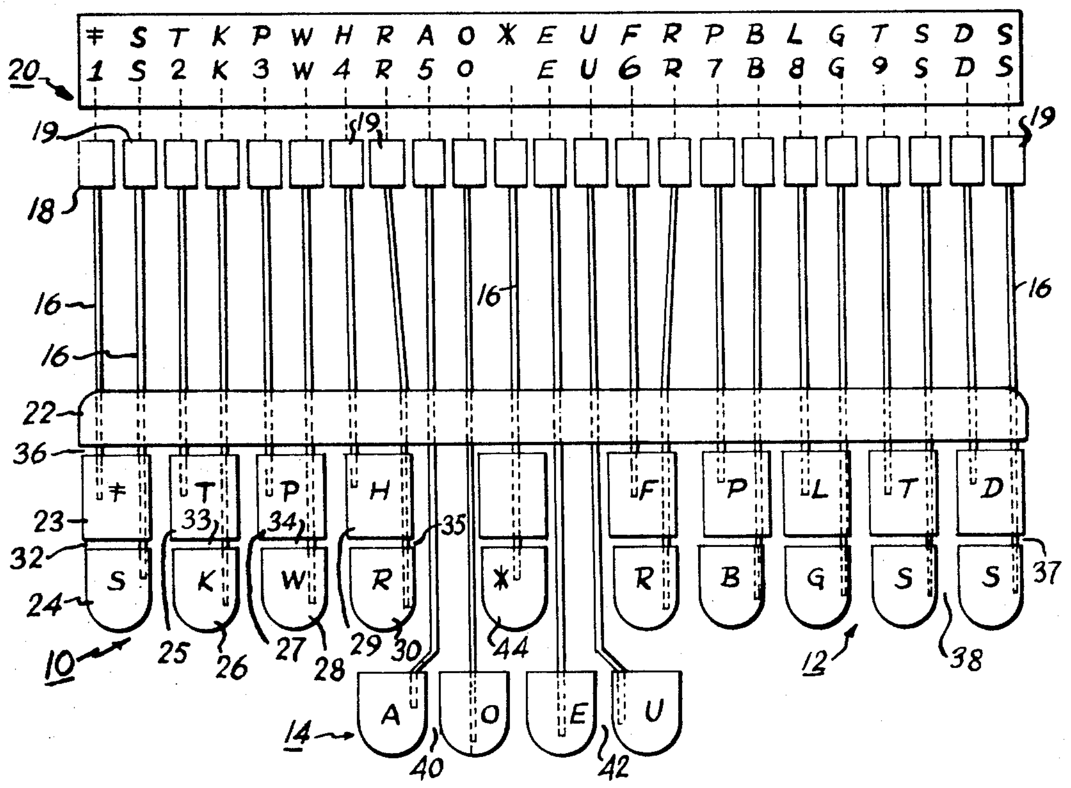

This invention relates to stenographic typewriters and particularly to keyboards for such typewriters.

In the normal operation of a stenographic typewriter, each syllable of a word ordinarily is represented by a combination of characters of phonetic value, such as the letters of the alphabet; e.g. a syllable may include a combination of initial consonants, vowels, and final consonants. In many of the keyboards that have been devised, including the common, standard keyboard, the thumbs tend to be used for the vowels, and the other fingers of the left and right hands for the initial and final consonants respectively. Thus, with each stroke of the fingers of both hands, an individual syllable can usually be constructed and imprinted by the appropriate combination of phonetic characters (in some cases, only a part of a syllable, and in others, an entire syllabic sequence is so imprinted). This stenographic system permits a certain amount of individual and standardized technique by an operator, whereby frequently repeated multisyllabic words or phrases can be written in abbreviated or mnemonic form by a syllable or a combination of characters. Though it is possible to use such abbreviations or mnemonics, there is no definite and reliable mechanism available for identifying them during the course of the typing operation. Since ambiguities do occur, it may be difficult to distinguish (within the context of a shorthand report) between a printed mnemonic and an actual, but unintentional word represented by the same combination of characters. In addition, it is not uncommon for a different person to transcribe the shorthand from the one who wrote it, and therefore a stranger to the spoken dictation can be confused where mnemonics are employed. Yet the judicious use of mnemonics and the concomitant saving of finger strokes can help to increase the speed of the operator. The same mnemonic combinations also lend themselves to usage for different words, so that it is often desirable to have a facility of more than one mnemonic identification so long as each is clearly represented by unique relationship of the mnemonics to the words that they represent.

Accordingly, it is among the objects of this invention to provide a new and improved stenographic typewriter having a mechanism for identifying mnemonic phonetic-combinations in printed stenographic copy.

Another object is to provide a new and improved keyboard for a stenographic typewriter for identifying mnemonic phonetic-combinations that are imprinted during the same finger stroke as that of the combination and which can be operated in a normal fashion with the full facility of the phonetic keyboard.

Another object is to provide a new and improved keyboard for a stenographic typewriter which can be employed with existing keyboards and without extensive changes of the design thereof or without requiring an operator to relearn the keyboard.

In accordance with one embodiment of this invention, a key for a printed character without phonetic value is added to the keyboard for use as a mnemonic identifier. The non-phonetic character that is chosen is a symbol without any phonetic significance or suggestion. This mnemonic key is selectively and simultaneously operable with the remaining phonetic keys in any desired combination by the operator's fingers in normal stenographic usage. It has been found that the standard keyboard in common use today can be readily adapted for this purpose with minor modifications. That is, the mnemonic key is provided as one of a pair of keys to be operated by one of the fingers of the operator. As with the other phonetic keys of the keyboard, the mnemonic key can be operated whenever needed and in any desired combination by way of a single finger stroke, and it may be operated with the other phonetic key in the same pair with the mnemonic key. Thus, mnemonic syllables or combinations may be fully identified in the printed copy by the same stroke producing the combination, and the imprinted mnemonics may incorporate any combination of phonetic characters.

Figure 2:
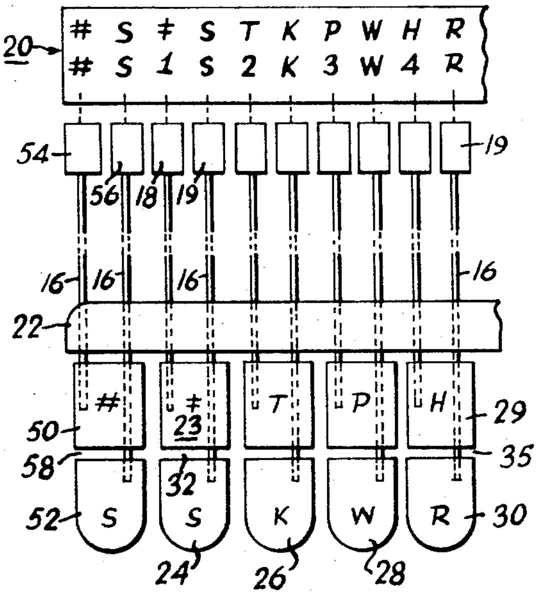

The foregoing and other objects of this invention, the various features thereof, as well as the invention itself, may be more fully understood from the following description when read together with the accompanying drawing, in which:

FIG. 1 is a schematic plan view of a stenographic typewriter embodying this invention; and FIG. 2 is a schematic plan view of a stenographic typewriter embodying a modified form of the invention.

In the drawing, corresponding parts are referenced throughout by similar numerals.

The stenographic typewriter illustrated in FIG. 1 includes three bands 10, 12 and 14 of keys, which correspond respectively to the keys used by the left-hand fingers, the right-hand fingers, and the thumbs. In a general way, it is similar to standard keyboards in common use. Each of these keys, in the embodiment of FIG. 1, is connected by an individual linkage 16 to an individual type bar 18 and 19. The linkage 16 is represented schematically by a simple connecting rod, but including in practice an appropriate, well-known mechanism for insuring operation with a suitably designed minimum of finger pressure and for stepping the paper tape with each stroke of one or more keys.

The type bars 18 and 19, which are represented schematically, carry type faces bearing characters corresponding to those indicated on the associated keys. The characters are imprinted on a paper tape 20 (which is illustrated schematically in the drawing in enlarged form and as bearing the imprint of the complete type faces associated with the corresponding type bars 18 and 19 merely for convenience in representing the characters thereof). In the standard keyboard, the type bars customarily carry two sets of characters, and the lower ones in some cases are numeric, and in other cases duplicates of the upper ones. The imprinting of the numeric characters and other lower characters is accomplished by actuation of a numeral bar 22 simultaneously with one or more character keys, which serves to shift the type bars for imprinting these lower characters.

The left-hand key bank 10 includes eight keys aligned in four pairs. The first pair of keys 23, 24, as illustrated, are for the symbol "≠" and the letter "S"; these keys 23, 24 are operated by the little finger. The next pair of keys 25, 26, operated by the ring finger, are for the characters "T" and "K." The keys 27, 28 for the middle finger are "P" and "W"; and the keys 29, 30 for the index finger are "H" and "R."

In a similar fashion, the right-hand key bank 12 includes four pairs of keys normally operated by the index, middle, ring, and little fingers for the characters "-F" and "-R," "-P" and "-B," "-L" and "-G," and "-T" and "-S" respectively. The hyphen (-) before each of these letters represents its use as a final consonant. In addition, a fifth pair of keys for the characters "-D" and "-S" are also operable by the little finger of the right hand alternatively with the pair of keys for "-T" and "-S." The thumb key bank 14 includes a pair for "A" and "O" operable by the left thumb, and a pair for "E" and "U" operable by the right thumb. These precise key assignments to individual fingers of the operator's hands are fixed in order that rapid "touch" operation of the typewriter is possible.

A "home" or normal position of the fingers is provided as a reference from which the fingers can move and to which they can return, so that each finger is able to reach its assigned key or keys without any substantial movement of the hand and with reliability of operation being insured. The "home" position for each of the fingers on the left-hand key bank 10 is the medial crack 32–35 between the two keys forming the associated key pair. Thus the left little finger has a "home" position on the medial crack 32, the ring finger on the medial crack 33, the middle finger on the medial crack 34, and the index finger on the medial crack 35. This "home" position of the left-hand fingers permits simultaneous operation of both keys of each pair by the associated finger. In addition, it permits single operation of either the upper or lower key of the associated pair by extension or flexion of the associated finger from the medial-crack position to the key platform. The extension-flexion movements are easy and rapid movements for these fingers. Thus very small and simple movements of each finger make it possible to actuate both keys of the associated pair or either of the two keys. In addition, each finger is used to produce a stroke at the numeric crack 36 between the shift bar 22 and the upper key of the associated key pair to print the numeric (or upper case) character of the type bar for that upper key. After each stroke, the operator tends to return his fingers to the "home" position, so that he always has a definite reference for all of the touch typing movements.

In a similar fashion, the fingers of the right hand have "home" positions on the medial cracks of the first four pairs of keys of key bank 12, with the little finger having its "home" position on the medial crack 37 on the "-T" and "-S" pair. The operation of these pairs of keys takes place in the same manner as described for the left-hand bank 10. In addition, by abduction of the little finger from its "home" position to the medial crack of the "-D" and "-S" key pair, the latter keys may be operated alternatively with, and in the same fashion as, the "-T" and "-S" keys. After operation of either or both of the "-D" and "-S" keys, adduction of the little finger returns it to its "home" position at the medial crack 37 of the "-T" and "-S" keys. The lateral crack 38 between these two pairs of keys is designed to be quite small so that the more difficult abduction-adduction movements of the little finger are small in extent; but crack 38 is sufficiently wide to clearly separate the two key pairs and prevent any false operation.

The left thumb has its "home" position on the lateral crack 40 between the "A" and "O" keys, and the right thumb has its "home" position on the lateral crack 42 between the "E" and "U" keys. The movements of the thumbs from their respective "home" positions 40, 42 to the platforms of either of the two vowel keys associated with each thumb are by way of abduction and adduction. These movements are easy and rapid ones for the thumbs. The abduction-adduction movements for the other fingers are relatively difficult and slow movements, and for that reason there is only a single such movement provided on the phonetic keyboard, and that is the one described above, in which the right little finger moves across the lateral crack 38 to handle the additional key pair for "-D" and "-S." An additional key pair that is customarily provided is actually a single key (through its platform is customarily formed in two parts) which is connected through its linkage 16 to a type bar 19 that carries as asterisk in the normal position and a blank in the shift position. The asterisk is variously used to identify punctuation, such as a new paragraph, and to correct notes, and the operation of key 44 together with the shift bar 22 merely produces a stepping of the paper tape to provide a space thereon. All of the other keys likewise produce a stepping of the tape with each stroke of the keys by way of conventional tape-stepping mechanism. The operation of key 44 is by abduction of either the left or right index finger from its "home" position, which movement prevents operation of this key 44 concurrently with all of the phonetic keys in the normal operation of the typewriter.

Except for the thumbs, the machine is ordinarily designed so that there is no operating position for any finger on any of the lateral cracks between the key pairs. A contrasted to the movements of the other fingers, abduction and adduction of the thumbs are natural and easily controlled, and the lateral cracks 40 and 42 for the vowel keys are quite narrow, corresponding to the medial cracks between the key pairs. In machine operation, the finger control at the true medial and lateral cracks 32–42 is more difficult than operation of the keys at their platforms. If the cracks are too wide, the finger has a tendency to sink into a crack, or a tottering may result which favors one key and results in the other not being fully depressed. Where the cracks are too narrow, the precision required to locate a crack and operate on it becomes excessive and difficult.

In operation, the keyboard illustrated in FIG. 1 is used in the same fashion as the conventional and standard stenographic keyboard, except in connection with the operation of key 23. The type bar 18 of the latter carries the sumbol "≠" which is a non-phonetic symbol (that is, it is a symbol devoid of phonetic value, which is the sense in which this term is used throughout). Key 23 may be operated independently of or concurrently with the other key 24 of its own key pair, as well as concurrently in the same finger stroke with any of the other keys or combination thereof in the usual phonetic operation of this keyboard. Thus, the keyboard is completely operable in the usual phonetic fashion to produce any and all of the usual phonetic combinations separately from key 23 or together with it. Consequently, key 23 serves as a mnemonic symbol for identifying any phonetic combination as an abbreviation or mnemonic combination, which idicates that it is to be treated specially and differently from its usual word or syllable representation. Type bar 18 carrier the number "1" in its shift position for imprinting by concurrent operation of key 23 and numeral bar 22 at numeral crack 36.

Some examples of the use of the non-phonetic symbol "≠" as a mnemonic illlustrate the added facility given the operation and how ambiguities are avoided: The two-syllable work "pickup" may be written in a single stroke and identified as a mnemonic, as follows: "≠PU-P." Thereby, any conflict with the word "pup," which is written with the same phonetic combination but without the mnemonic symbol, is clearly and readily eliminated. Similarly, the word or prefix "under" can be written with a single stroke "≠U-N" which would avoid any ambiguity with the prefix "un" in words such as "underfed" and "unfed," or "undermanned" and "unmanned." A suffix such as "matic" may be abbreviated in a single stroke as "≠MA-T" to avoid conflicts between words such as "automat" and "automatic." Other numerous examples will become readily apparent to those skilled in the art. From these few examples, it is seen that the full range of versatility of the standard keyboard is provided without loss or restriction.

No extra control or finger facility is required to use the mnemonic key 23, and added versatility of clearly identifying all mnemonics and abbreviations permits the saving of a substantial number of strokes and thereby an increase of speed. These mnemonics may become part of the operator's repertoire and in addition may be developed in the course of any dictation or testimony. With a check list of mnemonics, and since they are clearly identified in the shorthand record, the operator (as well as a typist other than the operator) is equipped to make a full and accurate transcription. The mnemonic key 23 can greatly expand the operator's range of use and assist in the development of mnemonics, with the concomitant saving of finger strokes.

A modified form of the invention is illustrated in FIG. 2, in which parts corresponding to those previously described are referenced by the same numerals. In this form of the invention, the keyboard and type bars are identical to those of FIG. 1, except that two additional keys 50 and 52 are provided as a key pair, which are connected in the same fashion as the other keys by suitable linkages 16 to the associated type bars 54 and 56. The numeral shift bar 22 operates with these key linkages in the same fashion as the others. The key 52 controls the type bar 56 bearing the letter "S" in its upper and lower positions, and the key 50 operates type bar 54 bearing a second, unique non-phonetic character "≠" in both positions. For simplicity of illustration, some of the remaining keys and type bars of this form of the invention are omitted from the drawing; their construction and operation are otherwise the same as described above with respect to FIG. 1.

The operation of the keyboard of FIG. 2 is the same as that described above except that keys 50 and 52 are operated as a key pair by the left-hand little finger aducted from its "home" position at medial crack 32 to operate either or both of keys 50 and 52. In practice, the initial "S" is normally operated by key 24; however, when initial "S" is required together with the second non-phenetic character "#," it is operated at the medial crack 58 between keys 50 and 52. In other respects the operation is the same as that described above. The keys 50 and 52 formed as a key pair provide additional versatility in the use of mnemonics. That is, there are situations in which it would be desirable to apply the same abbreviation to more than one word. For example, the words "medium" and "medical" are both adapted to be identified by the same phonetic combination, provided they are distinguished by different mnemonic identifiers. With the keyboard of FIG. 2, one of these words can be identified by "≠ME-D" and the other by "#ME-D." Similarly, the words "value" and "valley" may be identified by the same phonetic combination but with different mnemonic identifiers, and one can be represented by "≠VA-L" and the other by "#VA-L." Though the keys 50 and 52 as a key pair require abduction-adduction movements of the left-hand little finger, this is a small movement which experience has shown is practical in connection with the corresponding key pair in the right-hand bank 12. In all other respects, the fingers and thumbs are uniquely assigned to their individual key pairs and normal operation of the keyboard is maintained.

In both the embodiments of FIG. 1 and FIG. 2, the mnemonic keys 23 and 50 and their associated type bars 18 and 54 are located so that the non-phonetic characters are printed as the first such characters on the left. Thereby, any printed mnemonic combination is quickly identified since the order in which a printed shorthand combination is scanned is from left to right. Thus, the transcriber of the stenographic copy is immediately cued to a proper translation of a phonetic combination either as a mnemonic or as a true syllable.

Thus it is seen from the foregoing description that a new and improved stenographic typewriter is provided in which a mechanism is used for identifying mnemonics in printed stenographic copy. The typewriter can be operated in a normal fashion with the full facility of the phonetic keyboard and the common, standard keyboard used today can be employed without extensive change or without requiring an operator to relearn the keyboard. It will also be apparent to those skilled in the art that the above-described embodiments are only exemplary of the various features of this invention, and that various modifications can be made within the scope of the invention as defined in the appended claims. For example, the principles of this invention may be employed with other stenographic keyboards than the standard keyboard with which it is illustrated. Various other non-phonetic symbols may be employed for the mnemonic indicator. In addition, in the standard keyboard the asterisk type bar may be dispensed with so that the same number of type bars employed in the standard machine may be used for the embodiment of FIG. 1; in that case, the punctuation indication afforded by the asterisk may be supplied by the non-phonetic character of key 23 used alone, and the spacer operation of key 44 may be maintained. Though it is preferred that the mnemonic key 23 (and the second mnemonic key 50) be located at the left side of the keyboard (because the transscriber is immediately cued during normal scanning and because no extensive modification of the standard keyboard is then required), these mnemonic keys and their associated type bars may be located at any part of the keyboard; however, if relocated, extensive revision of the standard keyboard may then be required.

As described above, each mnemonic key can be used to assign any desired meaning to any specific phonetic character or combination of such characters written in the same stroke with it. The character or combination of characters identified by a mnemonic can be chosen in the usual fashion for developing word or phrase abridgments, or even in an arbitrary fashion. The use of the mnemonic symbol affords a wide range of flexibility in assigning such character combinations as a mnemonic representation. The mnemonic key is also useful in resolving conflicts in what ever way they occur. For example, homonyms such as "boy" and "buoy" can be readily distinguished by assigning a mnemonic key to one of them, and speech-hiatus fillers such as "uh" or "m-m" can be clearly identified by judicious use of the mnemonic key. In addition, a mnemonic-identified character combination may be assigned to represent more than one word, where they are different parts of speech, or can otherwise be distinguished within the context. Two or more stroke combinations can also be developed to represent many-syllabled words or phrases and identified by a mnemonic. For this purpose it would generally be desirable to use the mnemonic in each such stroke.

The mnemonic keyboard of this invention does not restrict the operator from using any mode of keyboard operation that is available with the present-day standard keyboard. Thus, the operator continues to have presently available use of the numeric characters. The mnemonic key can also be used with numerics, if desired. For this purpose, it is preferable to have (e.g. in the keyboard of FIG. 1) the same mnemonic character in both the upper and lower case positions on the type bar and the numeric -1 as the upper case character for the initial -S type bar. Similarly, where two mnemonic keys are employed (e.g. in the keyboard of FIG. 2), the mnemonic characters are used in both positions of the mnemonic type bars, and the numeric -1 in the upper-case positions for both initial -S type bars. Alternatively, the numeric characters may be rearranged on the various keys other than the mnemonic since their locations are not critical. Thereby, the mnemonic identifier can be used with all of the customary combinations of numerics and used to assign any desired meanings thereto, so as to save strokes, such as, for example, to reverse the printed numeric order, to indicate the repetition of a digit (e.g.

"≠1" could represent "11," "≠2" could represent "22," etc.), and to give a special value (e.g. hundreds, thousands, millions, etc.) to the printed mnemonic combination.

What is claimed is:

1. A stenographic typewriter comprising:

a keyboard having three groups of keys associated respectively with the thumb fingers of an operator's hands, the other fingers of the left hand, and the other fingers of the right hand, said other-finger keys being arranged as closely adjacent pairs with a space therebetween and each of said key pairs being associated with a different one of said other fingers for operation together by the associated finger located at a home position of said space therebetween and for operation singly by flexion and extension of the associated finger from said home position, said thumb keys being arranged as adjacent pairs associated respectively with said thumb fingers for operation singly or together by abduction and adduction of said thumbs, said keys being compactly arranged and individually, selectively and simultaneously operable in any combination thereof by any and all of said fingers of both hands in accordance with the individual association of each key and key pair to a single finger; and a bank of type bars individually connected to said keys for operation in any combination therewith, certain ones of said type bars bearing type faces representative of phonetic characters;

the combination therewith of one of said type bars for the key pair associated with the little finger of the left hand bearing a type face representative of a non-phonetic, mnemonic character so that a mnemonic symbol can be selectively imprinted by operation of the associated key by the little finger at said home position in the same finger stroke with that producing a combination of phonetic characters, whereby desired meaning may be arbitrarily assigned to any combination of phonetic characters; the others of said type bars bearing type faces representative of said phonetic characters corresponding to vowels for keys associated with thumbs, initial consonants for keys associated with the left hand, and final consonants for keys associated with the right hand, the keys of said vowels and consonants being arranged with said non-phonetic key so that the keyboard is operable to produce any phonetic combination separately from the mnemonic key or together with it.

2. A stenographic typewriter as recited in claim 1 wherein said non-phonetic type bar is the left-most one of said bank.

3. A stenographic typewriter as recited in claim 1 and further comprising an additional key pair associated with said left-hand little finger for operation alternatively with the key pair of said mnemonic key by abduction and adduction of said finger; and an additional pair of type bars individually and operably connected to said additional keys, the type bars connected to said additional key pair and the key pair for said mnemonic including duplicate phonetic type faces and different non-phonetic, mnemonic type faces, whereby different menmonic symbols are imprinted by operation of the associated keys.

4. A stenographic typewriter as recited in claim 1 wherein the type faces associated with the key pairs for the little, ring, middle and index fingers are respectively said non-phonetic and "S," "T" and "K," "P" and "W" and "H" and "R" for the left hand, and "T" and "S," "L" and "G," "P" and "B," and "F" and "R" for the right hand, and the type faces for an additional key pair connected for alternative operation by the right-hand little finger are "D" and "S."

References Cited

UNITED STATES PATENTS

| | | | |
|---|---|---|---|
| 1,283,198 | 10/1918 | Ireland | 197—9 |
| 1,293,739 | 2/1919 | Edwards | 197—9 |
| 1,512,001 | 10/1924 | Cerny | 197—9 |
| 1,731,614 | 10/1929 | Etherton | 197—9 |
| 1,899,232 | 2/1933 | Outer | 197—9 XR |
| 2,246,195 | 6/1941 | Sweeney | 197—9 |
| 2,343,905 | 3/1944 | Henze et al. | 197—9 |
| 2,343,926 | 3/1944 | Pollock | 197—9 |
| 2,399,769 | 5/1946 | Sweeney | 197—9 |
| 2,823,784 | 2/1958 | Ambrose | 197—9 |
| 2,847,104 | 8/1958 | Segui | 197—9 |

EDGAR S. BURR, Primary Examiner

U.S. Cl. X.R.

197—11

PO-1050
(5/69)

JAN 7 1970

UNITED STATES PATENT OFFICE

CERTIFICATE OF CORRECTION

Patent No. 3,465,865 Dated September 9, 1969

Inventor(s) David J. Parker

It is certified that error appears in the above-identified patent and that said Letters Patent are hereby corrected as shown below:

The present address of the inventor should be changed to read --P. O. Box 505, Riverdale, Maryland 20840--..

Col. 2, line 37, "bands" should be --banks--.

Col. 4, line 5, "through" should be --though--; line 14, --the-- should be inserted between "of" and "con-"; line 22, "A" should be --As--; line 40, "sumbol" should be --symbol--; line 52, "idicates" should be --indicates--; line 54, "carrier" should be --carries--.

Col. 5, line 2, --an--should be inserted between "and" and "added"; line 27, "≠" should be --#; line 35, "aducted" should be --abducted--; line 39, "non-phenetic" should be --non-phonetic--.

Col. 6, line 41, "what ever" should be --whatever--.

Col. 8, line 15, "menmonic" should be --mnemonic--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents